No. 773,188. PATENTED OCT. 25, 1904.
W. F. BOAST.
LATHE LENS HOLDER.
APPLICATION FILED APR. 19, 1904.
NO MODEL.

Witnesses

Inventor
W. F. Boast.
By R. W. & A. P. Lacey, Attorneys

No. 773,188. Patented October 25, 1904.

UNITED STATES PATENT OFFICE.

WILLIAM FREDERICK BOAST, OF COLBY, KANSAS.

LATHE LENS-HOLDER.

SPECIFICATION forming part of Letters Patent No. 773,188, dated October 25, 1904.

Application filed April 19, 1904. Serial No. 203,934. (No model.)

*To all whom it may concern:*

Be it known that I, WILLIAM FREDERICK BOAST, a citizen of the United States, residing at Colby, in the county of Thomas and State of Kansas, have invented certain new and useful Improvements in Lathe Lens-Holders, of which the following is a specification.

This invention provides means for attaching to a lathe a lens or magnifying-glass, thereby obviating the constant wearing of the eyeglass used by watchmakers and other artisans in fine lathework.

This invention provides a lens-holder which is adjustable in every part to admit of accommodating the lens to the position of the work, whereby the latter may be at all times under inspection.

An essential feature of the invention is the provision of means whereby complemental lenses may be focused upon the work when it is required to magnify the same to an appreciable extent or which will admit of throwing one of the lenses out of the way when the work is of such character as not to require magnifying to any very great degree.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
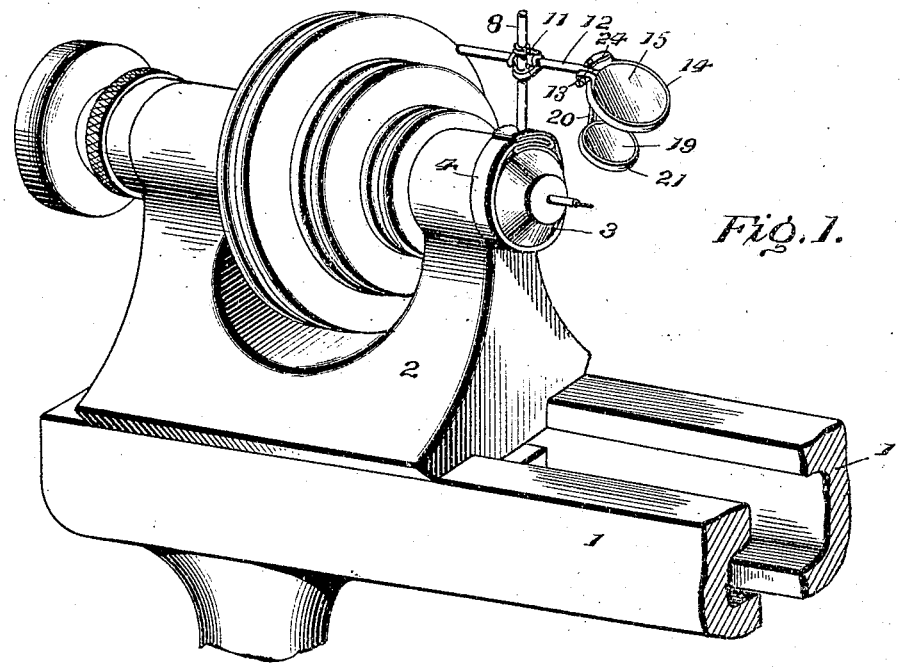
Figure 2:
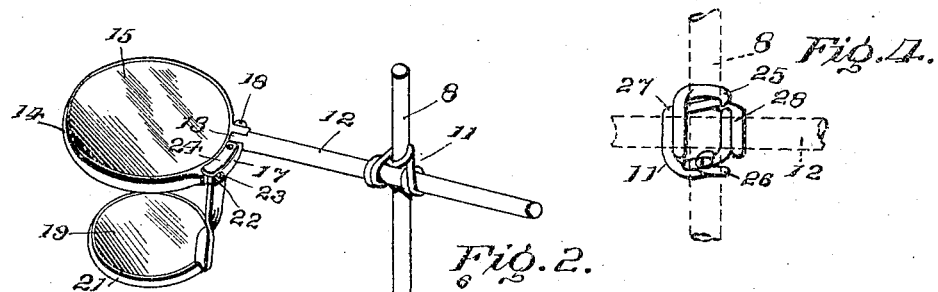
Figure 4:
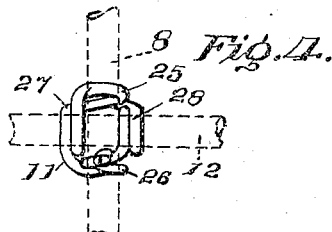
Figures 3, 5:
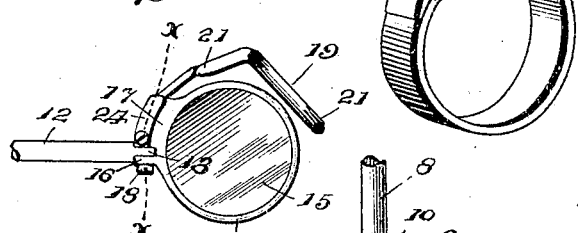
Figure 6:
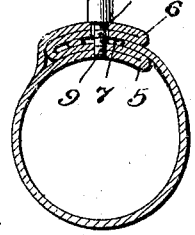
Figure 7:
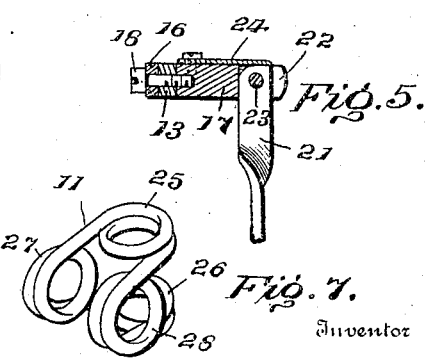

Figure 1 is a perspective view of the head portion of a watchmaker's lathe, showing the lens-holder in position. Fig. 2 is a perspective view of the lens-holder on a larger scale. Fig. 3 is a top plan view of the main lens, showing the auxiliary lens turned so as to lie at one side thereof. Fig. 4 is a detail view in elevation of the binder for holding the arm and post in determinate position. Fig. 5 is a section on the line X X of Fig. 3 looking in the direction of the arrow, the arm of the auxiliary lens being turned to occupy a position at right angles to the main lens and having its outer end portion broken away. Fig. 6 is a front view of the clamp-band, showing the joint in section and having the upper portion of the post broken away. Fig. 7 is a detail perspective view of the binder.

Corresponding and like parts are referred to in the following description and indicated in all the views of the drawings by the same reference characters.

The lathe indicated is typical of the variety for which the invention is designed and comprises the bed 1 and head 2, to which the spindle having the power applied thereto and to which the work is attached is journaled. The spindle is provided with the usual dust-band 3, which is attached to a part of the head 2 in the well-known manner.

The holder forming the basis of this invention is secured to the dust-band 3 preferably by means of the clamp-band 4, which is adjustable, so as to be fitted to different sizes of dust-bands. The clamp-band 4 is composed of a metallic strip, and one end portion is folded upon itself, as shown at 5, thence refolded and doubled upon itself, as shown at 6, the extremity being secured to the body of the band in rear of the fold in any substantial manner either by being brazed, soldered, or riveted. The folded portions 5 and 6 are spaced apart a distance to receive the opposite end portion of the band and constitute jaws, since they grip the end portion of the band in which is formed a longitudinal slot 7. A post 8 has an end portion, as 9, reduced and threaded and passed through registering openings in the jaws 5 and 6, the opening in the jaw 5 being threaded to make screw-thread connection with the reduced end 9. The shoulder 10, at the base of the reduced end 9, is adapted to bear against the jaw 6 and cause the jaws 5 and 6 to grip the slotted end 7 of the band 4 and hold the same secure upon the dust-band 3 or other portion of the lathe to which the holder may be applied. The post 8 is round and is of uniform size throughout its length to admit of rotary and sliding movement of the binder 11 thereon.

An arm 12, preferably of a diameter corresponding to that of the post 8, is secured to the latter by means of the binder 11 in any adjusted position. An end portion of the arm 12 has opposite sides cut away to form the reduced portion 13, whose opposite sides are flattened and confined between the terminal portions of the frame 14 of the main lens 15. A lug 16 is provided at one end of the frame 14 and a lug 17 is provided at the opposite end, the two lugs being drawn together by means of a screw 18, passed loosely through the lug 16 and the reduced end 13 and threaded into the lug 17. By this means the friction between the lugs 16 and 17 and the reduced end portion 13 of the arm 12 may be regulated so as to hold the lens in any angular adjustment.

The auxiliary lens 19 has an arm 20 projected from its frame 21 and its end portion received in an open slot 22 at the outer end of the lug 17 and connected to said lug by the pivot-fastening 23. A spring 24 is secured at one end to the lug 17 and is adapted to bear upon either the end of the arm 21 or a side of said arm, so as to hold the lens 19 either in the position shown in Figs. 1 and 2 or in the position shown in Fig. 3, which represents the location of the auxiliary lens when turned aside.

The binder 11 is preferably formed of spring-wire bent to provide coils 25, 26, 27, and 28. The coils 25 and 26 receive the post 8, whereas the coils 27 and 28 receive the arm 12. The coils grip the parts 8 and 12 with such force as to hold them in relative position and prevent any possible slipping. The coils 25 and 26 are in a different plane from and intermediate of the coils 27 and 28, and the several coils have a contractile action, so as to grip the elements 8 and 12 and hold them in place.

The clamp-band 4 may be fitted to the dust-band 3 or like part in any position, whereby the post 8 may be vertical or occupy any desired angle with reference to the clamp-band. The arm 12 may be moved to any position upon the post 8 and may be slid in the binder so as to bring the lens to any distance from the post 8 within the range of its adjustment. The arm 12 may be turned in the binder so as to incline the lens or may be turned upon the post to any angular position. It will thus be seen that the construction is such as to provide a variety of adjustment to meet all possible conditions. When both lenses are required for conjoint use, the arm 21 is turned to occupy a position about at right angles to the lens 15, thereby bringing the main and auxiliary lenses in register, as indicated in Figs. 1 and 2; but when it is not required to use the auxiliary lens the same may be turned to one side, as indicated in Fig. 3.

Having thus described the invention, what is claimed as new is—

1. In a lens-holder, the combination of a post bearing the lens, and a clamp-band for attaching the post to a machine, said clamp-band being adjustable and having its end portions connected by means of the aforesaid post, substantially as specified.

2. In a lens-holder, the combination of a post bearing the lens, and a clamp-band for attaching the post to a machine, said clamp-band having companion jaws at one end to receive the opposite end portion which are adapted to be drawn together by means of said post to grip the opposite end portion of the band between them, substantially as set forth.

3. In a lens-holder, the combination of a post bearing the lens, and a clamp-band for attaching the post to a machine, said clamp-band having an end portion folded upon itself and refolded to provide companion jaws to receive the opposite end portion of the band, said jaws being drawn together by means of the post to grip the opposite end portion of the band, substantially as described.

4. In a lens-holder, the combination of a main lens, an auxiliary lens pivoted to the frame of the main lens, and a spring for holding the auxiliary lens in either one of its extreme positions, substantially as described.

5. In a lens-holder, the combination of a main lens, an auxiliary lens having an arm pivotally connected to the frame of the main lens, and a spring applied to the frame of the main lens and adapted to bear against either the end or the side of said arm to hold the auxiliary lens either in or out of coöperative position with the main lens, substantially as specified.

6. In a lens-holder, the combination of an arm, a lens-frame having lugs at its extremities to embrace opposite sides of said arm, and means for pivotally connecting said lugs to the arm and creating sufficient friction to hold the lens in an adjusted position, substantially as set forth.

7. In a lens-holder, the combination of a post provided with means for attaching it to a machine, an arm provided with the lens, and a binder comprising sets of spring-coils for receiving the post and arm and holding the same at any determinate adjustment, substantially as set forth.

8. In a lens-holder, the combination of a post provided with means for attaching it to a machine, an arm provided with the lens, and a binder formed of wire comprising sets of coils receiving the arm and post and adapted to hold the same in any relative adjusted position, substantially as specified.

9. In a lens-holder, the combination of a post, means for attaching said post, a main lens carried by said post, and an auxiliary lens pivoted to the frame of the main lens.

10. In a lens-holder, the combination of a post, means for attaching said post, a binder slidably mounted upon the post, an arm slidable in said binder, and a lens carried by the arm.

In testimony whereof I affix my signature in presence of two witnesses.

WILLIAM FREDERICK BOAST. [L. S.]

Witnesses:
A. E. PETERSON,
A. P. TONE WILSON, Jr.